Dec. 22, 1970 G. C. WATLING ET AL 3,550,093
METHOD FOR GENERATING ELECTRICAL SIGNALS REPRESENTATIVE
OF ECONOMICAL NETWORK CONFIGURATIONS
Filed June 15, 1967 6 Sheets-Sheet 1

FIG. 1

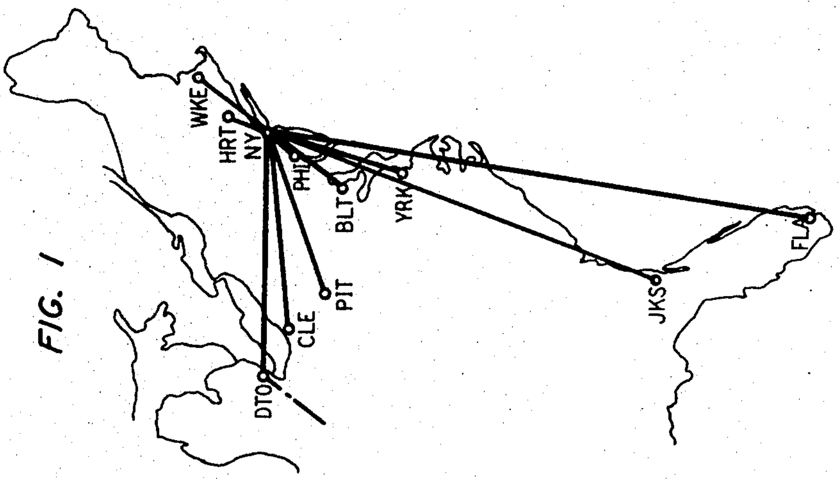

FIG. 2

| CITY NAME | DISTANCE TO SWITCHING CENTER | REQ'D. NO. OF ACCESS LINES | INTER-REGIONAL TRUNKS | FACILITIES PL | A | B | C | D | TOTAL COST |
|---|---|---|---|---|---|---|---|---|---|
| NEW YORK | 0 | 29 | 32 | 0 | 0 | 0 | 0 | 0 | $ 5582.50 |
| PHILADELPHIA | 82 | 5 | 0 | 5 | 0 | 0 | 0 | 0 | 978.20 |
| HARTFORD | 99 | 5 | 0 | 5 | 0 | 0 | 0 | 0 | 1149.90 |
| BALTIMORE | 171 | 21 | 0 | 0 | 0 | 1 | 0 | 0 | 3840.00 |
| WAKEFIELD | 194 | 4 | 0 | 4 | 0 | 0 | 0 | 0 | 1687.52 |
| YORKTOWN | 284 | 11 | 0 | 0 | 1 | 0 | 0 | 0 | 4480.00 |
| PITTSBURGH | 316 | 3 | 0 | 3 | 0 | 0 | 0 | 0 | 1944.97 |
| CLEVELAND | 403 | 5 | 0 | 5 | 0 | 0 | 0 | 0 | 3988.50 |
| DETROIT | 493 | 20 | 32 | 0 | 0 | 0 | 1 | 0 | 12725.00 |
| JACKSONVILLE | 840 | 3 | 0 | 3 | 0 | 0 | 0 | 0 | 4541.07 |
| FORT LAUDERDALE | 1073 | 10 | 0 | 0 | 1 | 0 | 0 | 0 | 16295.00 |
| | | | | | | | | TOTAL | 57212.66 |

INVENTORS
G. C. WATLING
J. H. WEBER
BY Lucian E. Canepa
ATTORNEY

FIG. 3

<table>
<tr><th colspan="7">TABLE OF CHARGES</th></tr>
<tr><th colspan="3">TELPAK TARIFF</th><th colspan="2">PRIVATE LINE TARIFF</th></tr>
<tr><th>TYPE</th><th>NO. CHANNELS</th><th>RATE</th><th>MILEAGE BAND</th><th>RATE</th></tr>
<tr><td>A</td><td>12</td><td>$ 15/MI/MO.</td><td>0 - 250 MI.</td><td>$ 2.020 / MI./MO.</td></tr>
<tr><td>B</td><td>24</td><td>$ 20/MI./MO.</td><td>251 - 500 MI.</td><td>$ 1.717 / MI./MO.</td></tr>
<tr><td>C</td><td>60</td><td>$ 25/MI./MO.</td><td>OVER 500 MI.</td><td>$ 1.616 / MI./MO.</td></tr>
<tr><td>D</td><td>240</td><td>$ 45/MI./MO.</td><td colspan="2" rowspan="2">PLUS $12.50 TERMINATION CHARGE PER MO. PER LINE AT A SWITCHING CENTER AND $ 25 TERMINATION CHARGE. PER MO. PER LINE AT AN ACCESS POINT. PLUS $ 27.50 CHARGE PER MO. AT EACH ACCESS POINT FOR EACH INCOMING PRIVATE LINE.</td></tr>
<tr><td colspan="3">PLUS $ 15 TERMINATION CHARGE PER MO. AT EACH END OF EACH TELPAK CHANNEL IN USE</td></tr>
<tr><td colspan="5">PLUS $ 5 DIAL CONDITIONING CHARGE PER MO. PER ORIGINATING END OF A LINE OR CHANNEL</td></tr>
<tr><td colspan="5">PLUS $25 SWITCHING CHARGE AT A SWITCHING CENTER PER MO. PER ACCESS LINE OR CHANNEL, AND A $ 30 SWITCHING CHARGE AT A SWITCHING CENTER PER MO. PER TRUNK.</td></tr>
</table>

FIG. 4

| ACCESS POINT | DISTANCE | SIZE | D/S |
|---|---|---|---|
| BLT | 171 | 21 | 8.14 |
| PHI | 82 | 5 | 16.40 |
| HRT | 99 | 5 | 19.80 |
| DTO | 493 | 20 | 24.65 |
| YRK | 284 | 11 | 25.82 |
| WKE | 194 | 4 | 48.50 |
| CLE | 403 | 5 | 80.60 |
| PIT | 316 | 3 | 105.33 |
| FLA | 1073 | 10 | 107.30 |
| JKS | 840 | 3 | 280.00 |

| POINT | ENDPOINT | LINES & TRUNKS | DISTANCE | COST | FACILITY |
|---|---|---|---|---|---|
| FLA | BLT | 10 | 934 | $14160 | TELPAK A |
| JKS | BLT | 3 | 683 | 3764 | 3 PRIVATE LINES |
| YRK | BLT | 11 | 150 | 2415 | TELPAK A |
| WKE | NYC | 4 | 194 | 1668 | 4 PRIVATE LINES |
| PIT | BLT | 3 | 196 | 1263 | 3 PRIVATE LINES |
| DTO | BLT | 52 | 411 | 10575 | TELPAK C |
| BLT | NYC | 105 | 171 | 8312 | TELPAK D |
| CLE | BLT | 5 | 307 | 3139 | 5 PRIVATE LINES |
| PHI | NYC | 5 | 82 | 953 | 5 PRIVATE LINES |
| HRT | NYC | 5 | 99 | 1125 | 5 PRIVATE LINES |
| NYC | | 148 | TERMINATIONS | 5610 | |
| | | | TOTAL COST | 52984 | |

| POINT | ENDPOINT | LINES & TRUNKS | DISTANCE | COST | FACILITY |
|---|---|---|---|---|---|
| FLA | BLT | 10 | 934 | $14160 | TELPAK A |
| JKS | BLT | 3 | 683 | 3764 | 3 PRIVATE LINES |
| YRK | BLT | 11 | 150 | 2415 | TELPAK A |
| WKE | NYC | 4 | 194 | 1668 | 4 PRIVATE LINES |
| PIT | BLT | 3 | 196 | 1263 | 3 PRIVATE LINES |
| DTO | PHI | 52 | 456 | 11700 | TELPAK C |
| BLT | PHI | 48 | 90 | 2730 | TELPAK C |
| CLE | PHI | 5 | 358 | 3577 | 5 PRIVATE LINES |
| PHI | NYC | 110 | 82 | 3902 | TELPAK D |
| HRT | NYC | 5 | 99 | 1125 | 5 PRIVATE LINES |
| NYC | | 148 | TERMINATIONS | 5645 | |
| | | | TOTAL COST | 51949 | |

United States Patent Office 3,550,093

Patented Dec. 22, 1970

3,550,093

METHOD FOR GENERATING ELECTRICAL SIGNALS REPRESENTATIVE OF ECONOMICAL NETWORK CONFIGURATIONS

Gertrude C. Watling, Red Bank, and Joseph H. Weber, Little Silver, N.J., assignors to Bell Telephone Laboratories, Incorporated, Murray Hill, N.J., a corporation of New York Filed June 15, 1967, Ser. No. 646,228
Int. Cl. G06f *7/00*
U.S. Cl. 340—172.5 6 Claims

ABSTRACT OF THE DISCLOSURE

A systematic procedure is given for reconfiguring the geographical layout of a private line switched network of the type that includes a switching center and a plurality of associated service points each directly connected to the center by a direct straightline route. The required point-to-center traffic handling capability for each point is specified. Additionally the applicable tariff schedule for the network is specified. In accordance with the procedure of the invention the straightline layout is reconfigured in a systematic step-by-step manner to form a tree structure of interconnections that minimizes the overall cost of the network.

BACKGROUND OF THE INVENTION

This invention relates to the selective processing of electrical signals and more particularly to an apparatus and method for selectively processing electrical signals that represent a specified network configuration. In accordance with the invention the input signals are processed in such a way as to derive therefrom electrical output signals representative of a reconfigured network characterized by a minimum or near-minimum cost.

Among the services available to meet the expanding communications needs of large geographically-dispersed users is a circuit-switched voice-grade system known as a common-control switching arrangement. This service allows a customer to have access to a large private-switched network in which the transmission facilities, whether used for access lines or inter-regional trunks, are fully dedicated to him but in which associated switching centers are shared among a number of users. The charges to the customer for such a service are based on the prevailing private line and Telpak tariffs.

A communication system of the above-described type is further characterized by the following attributes:

(1) The capacities of the various segments of the interconnecting routes of the system vary.

(2) The cost per unit of capacity along any route decreases as the total route capacity increases.

(3) All requirements originate or terminate on one of a small subset of the total number of points in the system. In other words, the system exhibits a tree structure of interconnections.

Under the private line and Telpak tariffs the costs to the customer for a system of the type described above are based on the number, the length and the density of trunks and access lines. Accordingly, the location and number of switching centers and the routing of the trunks and access lines are extremely influential in determining the total cost of the system to the user. Much time and effort are required to manually design a customer's network to meet his traffic dimensions and minimize his cost. Ordinarily, such a procedure must be carried out when an initial proposal is made to a prospective customer and periodically thereafter whenever the customer's traffic requirements change sufficiently to warrant a new network configuration.

The problem of how best to design a switching network to achieve a minimum-cost configuration is a significant one whose solution has been actively sought. Heretofore the problem has been solved by engineers employing various manual techniques based to a large extent on intuition and the pattern recognition capabilities of human beings. However, such techniques are typically cumbersome and frequently inaccurate.

SUMMARY OF THE PRESENT INVENTION

An object of the present invention is to solve the above-specified problem in a high-speed way in a systematic step-by-step manner.

More specifically an object of this invention is a systematic time saving method in accordance with which the arrangement of a distribution network can be quickly and accurately reconfigured to minimize the overall cost thereof.

Another object of the present invention is a precise high-speed apparatus adapted to convert signals representative of an input network configuration to signals that specify a reconfigured minimum-cost arrangement.

Briefly, these and other objects of the present invention are realized in a specific illustrative embodiment thereof that includes an input unit to which are applied data signals representative of a network to be reconfigured. These applied data signals specify (1) the locations of the customer points included in the network, (2) the tariff schedule applicable to the network, and (3) the number of lines required between each access point and the switching center of the network.

The network under consideration is first priced by considering each access point to be directly connected to the associated switching center. Then, selecting the access points one at a time, the embodiment of the invention compares the cost of rerouting lines from other access points through each selected point to the switching center with the cost without such rerouting in an orderly manner. The less expensive arrangement is accepted as definitive of a new network configuration. Points through which others are routed are called via points and, as the signal processing operation continues, via points are joined to other via points to form branches of a tree configuration in which the switching center is positioned at the root thereof.

During the data processing operation any access point may be routed through a via point if the access point is closer to the via point than it is to the switching center, provided that the access point is not already in the path between that via point and the switching center. The latter restriction means that once an access point is homed on another access point, the decision with respect to the connection thereof is not reversible. However, a subsequent iteration of the basic data processing operation permits such reversals to take place under certain specified circumstances to be described in detail later below.

Given a particular via point, all access points eligible for rerouting are reconfigured in order of ascending distance from the via point, since most of the cost savings occur with reductions in mileage charges. In this way Telpak channels near the via points are quickly established thereby making spare channels available for more distant access points.

The order in which access points are selected as via points during the data processing operation characteristic of the present invention is chosen to encourage the aforementioned tree configuration to be formed in an economical manner. In this selection process the access point-to-switching center distance is a significant factor, for the closer a particular access point is to be switching center, the more likely it is that paths from more distant access points will be routed through the particular point. The required access point-to-switching center capacity or size is also significant, for while a particular access point may be farther away from the switching center than from other access points, the particular point may have a large size requirement which will encourage the formation of large economical Telpak sections having spare channels. Accordingly, the data processing operation of the invention is adapted to order the access points as potential via points in accordance with their respective ratios of distance to size. In this way, the access points selected first as via points are those points most likely to need large, short Telpak sections.

The transmission facility assigned between an access point and its via point may be all private lines, some combination of private lines and Telpak channels or all Telpak channels, which ever is most economical. The choice depends principally on the number of lines required and the distance the facility spans. But other charges (such as termination, switching and conditioning charges to be described below) are influential in making the assignment.

It is a feature of the present invention that electrical signals representative of a network comprising a switching center and a plurality of associated access points be processed in a systematic step-by-step way that includes ranking the access points in order of their respective ratios of distance (from the access point to the switching center) to capacity (between the access point and the switching center).

It is a further feature of this invention that the ranked points be selected in order as potential via points and that for each such via point those access points which are closer to the via point than to the switching center be routed through the via point if the cost of the route through the via point to the switching center is less than the existing access point-to-center route excluding the via point.

BRIEF DESCRIPTION OF THE DRAWING

A complete understanding of the present invention and of the above and other objects, features and advantages thereof may be gained from a consideration of the following detailed description of a specific illustrative embodiment thereof presented hereinbelow in connection with the accompanying drawing, in which:

FIG. 1 depicts the initial configuration of an exemplary switched network that includes a switching center and 10 associated access points each directly connected to the center;

FIG. 2 is a table specifying the nature and cost of the network shown in FIG. 1;

FIG. 3 is a detailed table of charges assignable to a network of the FIG. 1 type;

FIG. 4 is a particular ordered ranking of the access points shown in FIG. 1;

DETAILED DESCRIPTION

Figures 5A, 5B:
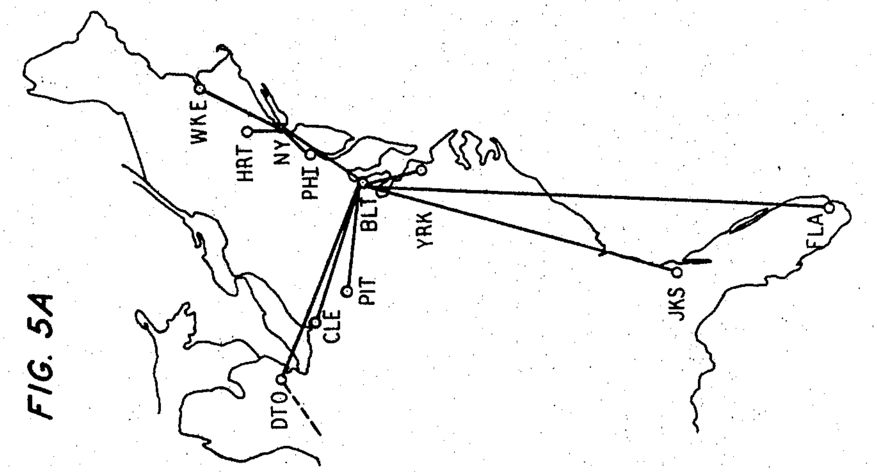
FIGS. 5A, 6A and 7 show various versions of the FIG. 1 network as reconfigured in accordance with the principles of the present invention.
FIGS. 5B and 6B are tables definitive of the networks of FIGS. 5A and 6A, respectively.

FIG. 1 is a map of a portion of the eastern section of the United States. Marked on the map are a switching center (represented by a small square) and 10 associated access points each represented by a small circle. More specifically the switching center is located at New York City (NY) and the access points are located at Wakefield (WKE), Hartford (HRT), Philadelphia (PHI), Baltimore (BLT), Yorktown (YRK), Jacksonville (JKS), Fort Lauderdale (FLA), Pittsburgh (PIT), Cleveland (CLE) and Detroit (DTO).

Each of the access points of FIG. 1 is indicated as being connected to the switching center by a direct straightline transmission facility. In this network configuration any access point can be connected to any other point by routes that extend through the switching center. Because of its inherently overlapping nature, however, such a configuration tends to be maximum or near-maximum in cost. The method and apparatus to be described herein are directed to reconfiguring the FIG. 1 arrangement to establish a new network characterized by a minimum or near-minimum cost.

Before proceeding to a detailed consideration of the principles of the present invention, it is necessary to specify more exactly the nature of and the cost factors involved in the network shown in FIG. 1. Assume that the lines connecting the access points to the depicted switching center have been dimensioned to provide the desired grade of service during the busy hour. (This is done using standard and well-known traffic engineering procedures.) In other words it will be assumed herein that the required number of access lines between each access point and the switching center is specified. Additionally, it is assumed that the network configuration shown in FIG. 1 is to be connected to another regional network via an inter-regional trunk connection. This connection is represented in FIG. 1 by a dashed line extending to DTO. Thus the transmission facility assigned between DTO and NY must accommodate not only the DTO-originated lines but also the trunks being routed through DTO.

FIG. 2 is a tabular listing that further defines the nature of the FIG. 1 configuration. The NY switching center and the 10 associated access points are listed in the left-most column of FIG. 2. The headings of the next 3 left-hand colums are self-explanatory. The next set of columns headed FACILITIES specify the number of private lines (PL) and the number of Telpak facilities (Type A, B, C or D) assigned between each access point and the switching center. Finally, the right-most column indicates the total cost attributable to each of the listed cities. At the bottom right of FIG. 2, the total overall cost of the FIG. 1 network configuration is specified to be $57,212.66.

The manner in which the costs listed in FIG. 2 are obtained can be understood from the table of charges of FIG. 3. As indicated in FIG. 3, the Telpak tariff includes 4 types, A, B, C and D. The type A Telpak facility, for example, includes 12 channels and costs $15 per mile per month. The private line tariff schedule is also listed in FIG. 3. Thus, for example, a 100-mile long private line would cost $202 per month.

The table of FIG. 3 also lists various termination, conditioning and switching charges assignable to the FIG. 1 configuration. Specifically, there is a $15 per month termination charge at each end of each Telpak channel in use. Also, for each private line there is a $12.50 termination charge per month at the switching center and a $25 termination charge per month at an access point. Additionally, there is a $27.50 charge per month at each access point for each private line incoming thereto. Further, there is a $5 dial-conditioning charge per month per originating end of a private line or Telpak channel. Lastly, there is a $25 per month switching charge at the switching center per line or channel and a $30 per month switching charge at the center per trunk.

With the FIG. 3 table in mind, it is a straight-forward matter to verify the costs listed in FIG. 2. Thus the costs assignable to the switching center at NY are broken down as follows:

| | |
|---|---|
| (1) Switching charges: | |
| NY's own 29 lines 29×$25 | $ 725.00 |
| 25 private lines into NY 25×$12.50 | 312.50 |
| 62 Telpak channels into NY 62×$25 | 1,550.00 |
| 32 trunks into NY 32×$30 | 960.00 |
| (2) Termination charges: | |
| 25 private lines into NY 25×$12.50 | 312.50 |
| 62 Telpak channels into NY 62×$15 | 930.00 |
| 32 trunks (via Telpak) into NY 32×$15 | 480.00 |
| | $5,582.50 |

Five access lines are required between PHI and NY. An 82-mile private line facility between PHI and NY costs 82×$2.02 or $165.64 per month per line. Five such lines cost $828.20. In addition there is a private line termination charge at PHI of $125 for 5 lines and a dial-conditioning charge thereat of $25. Thus the total cost assignable to PHI for private line service is $978.20 per month. By comparison, a type A Telpak facility between PHI and NY would cost 82×$15 or over $1,000 per month for mileage charges alone. Hence the less expensive private line facility is selected to connect PHI or NY. The above-indicated $978.20 cost therefor is listed in FIG. 2.

In a similar manner, based on the information contained in FIGS. 2 and 3, it is easy to determine that a 5-line private facility between HRT and NY is less expensive than a type A Telpak facility therebetween. The exact cost of the private line facility between HRT and NY is calculated in a manner analogous to that specified above for PHI.

As indicated in FIG. 2, BLT has a 21-line requirement A private line facility betwen BLT and NY would cost over $6,000, whereas the mileage charges for a Telpak B therebetween are only approximately $3,000. Therefore, the Telpak B facility is selected therefor. The exact mileage cost of the selected facility is $20 (Telpak B rate)×171 (BLT to NY distance) or $3,420. In addition, BLT incurs a Telpak termination charge of $315 and a dial-conditioning charge of $105. Accordingly, the total cost for BLT is $3,840, as indicated in FIG. 2.

By following the procedure described above, the specified costs for the remaining 7 access points listed in FIG. 2 can be easily verified.

Given the network illustrated in FIG. 1, the first step of the systematic reconfiguring procedure that embodies the pricinples of the present invention is to rank the access points $P_i$ in accordance with a specified characteristic of capacity and distance. As indicated above, the capacity or size S of a point is the number of access lines required between the point and the switching center, and the distance D of the point is the number of miles between it and the switching center. Illustratively the ranking of the herein-considered access points is ordered in accordance with the ratio D/S. Employing this particular criterion, the ordered ranking depicted in FIG. 4 is obtained.

The next step of the inventive procedure is to select in order the points listed in FIG. 4 and to try to make each such point a so-called via point through which other access points are routed to the switching center. This selection is made point-by-point from top-to-bottom in FIG. 4. In accordance with this step, BLT, a relatively large-capacity point that is relatively close to NY, is chosen as the first potential via point V.

Given BLT as the first potential via point V, the access points $P_i$ are then considered point-by-point in order of increasing distance from V. Each such access point is considered for rerouting through V if the access point is closer to V than it is to the switching center SC. The lines from each access point considered for rerouting through V are actually routed through via point V if the calculated cost on the route P-to-V-to-SC is less than that excluding V. In accordance with these specified criteria, all access points closer to BLT than to NY are initially connected to BLT which leads to the necessity for a Telpak D facility between BLT and NY. The resulting network configuration is specified in FIG. 5.

The procedure of the invention includes a look-ahead feature according to which access points are considered for rerouting through via points in groups of 1, 2, 3 and 4. This feature is based on the realization that if a single point is rerouted, the number of lines between the via point and the switching center may not thereby increase sufficiently to warrant a larger Telpak type with an accompanying reduction in cost. At the same time the extra mileage charges incurred by the rerouting will make the rerouting more expensive than the currently existing configuration. However, if a particular access point under consideration is grouped with 2 or 3 additional access points, the required Telpak section may become sufficiently large to reduce the total cost of the route.

In continuing down the ordered ranking of FIG. 4, the assignment of potential via points and the rerouting of access points therethrough are carried out in a step-by-step manner in accordance with the procedure specified above. During this portion of the procedure, via points may be connected to each other, but no point P which homes on a particular V is permitted by the procedure to become in turn a via point for that V.

Figures 6A, 6B:
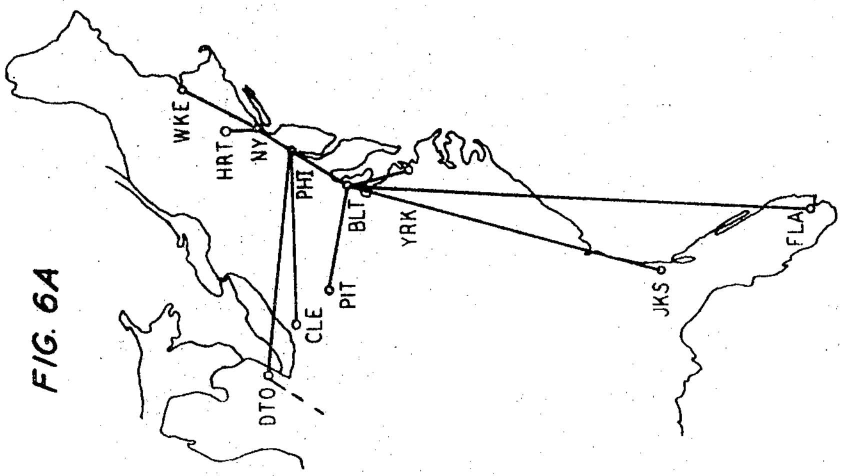

In accordance with the specified procedure, the network of FIG. 5 is reconfigured to make PHI a via point for BLT. Then all the points connected to BLT are considered for connection directly through PHI to New York. However, the cost of the overall network cannot thereby be reduced until CLE and DTO are considered together for connection to PHI. Most of the points are substantially closer to BLT than to PHI, but CLE and DTO are not much farther away and the increase in mileage cost is more than offset by the fact that BLT's total requirement is thereby reduced from 105 lines to 48. As a result, only a Telpak C is then needed from BLT. The resulting configuration of the illustrative network at this point of the procedure is specified in FIG. 6.

In accordance with the ordered ranking of FIG. 4, HRT is next considered as a potential via point for the network. As a result, WKE is routed through HRT to NY.

DTO, because of its relatively high ranking in the list of FIG. 4, is chosen as a potential via point before either CLE or PIT. DTO with all its lines and trunks requires a Telpak C, and there are sufficient spares available in this facility to service the 5 lines from CLE and subsequently the 3 lines from PIT.

Figure 7:
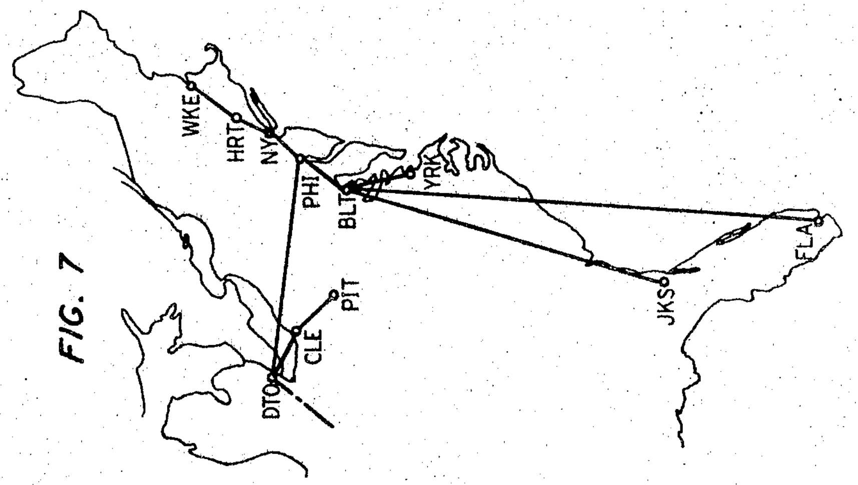

The resulting network after considering HRT and DTO as via points during the course of the herein-described systematic procedure is shown in FIG. 7.

Figure 8:
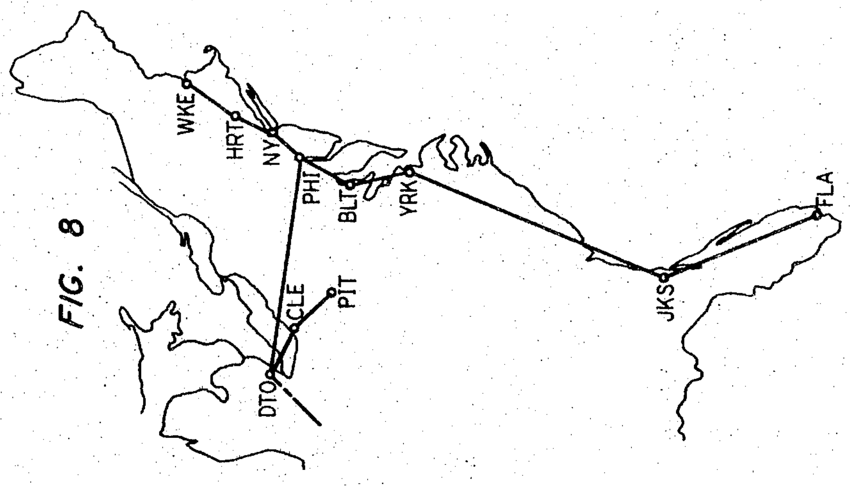
FIG. 8 shows the FIG. 1 network after being reconfigured to a near-final version specified by the method and apparatus of the present invention.

Subsequently, YRK, FLA and JKS are considered as via points in that order in accordance with the specified steps of the procedure described above. As a result of this particular part of the procedure, a continuous route from FLA to JKS to YRK to BLT is established, as shown in FIG. 8. FIG. 8 depicts a near-final version of the network configuration. The total cost of the FIG. 8 arrangement is $46,500.96. Several additional processing steps to be described below attempt to further lower the cost of the illustrative configuration.

It is apparent that the facility placed between an access point and its via point will in turn affect the facility placed between the via point and its via point. This is so because of the aforespecified termination and other charges and because more lines are required along the new path. The tree configuration generated by the procedure of the invention is accordingly a dynamic structure in which the facility required and the cost incurred at a particular point depend on the branches connected to the point. In accordance with this procedure both the old path and the new one are completely reconstructed and repriced every time a change in the network is made. Specifically, when a particular point is considered for movement from one branch of the tree configuration to another, the procedure of the invention traces the point's old path to the switching center. The total access line requirements and incoming private line counts attributable to the particular point are then substracted from the total counts at all points on the path. The old paths are then repriced. The cost of connecting points to the new via point are computed and finally the path of the new via point is constructed and priced.

To illustrate the repricing procedure, consider that portion of the example specified above in which CLE and DTO were considered for disconnection from BLT and connection to PHI. Having disconnected CLE and DTO from BLT, the first link repriced was the one between BLT and PHI where the Telpak size change and the connection charges at BLT decreased due to the elimination of the 5 incoming private lines from CLE. Next the two links joining CLE and DTO to PHI were priced. Since CLE retained 5 private lines, the connection charges which were removed from BLT reappeared at PHI even though the total line requirement at PHI remained the same. Finally, the link between PHI and NY was repriced.

By following the procedure specified above, the network configuration shown in FIG. 8 is arrived at in a step-by-step manner. An additional step of the inventive procedure is directed at attempting to further lower the cost of the configuration by reconstituting loops such as the PIT-to-CLE-to-DTO-to-PHI loop of FIG. 8. In general terms this step of the procedure may be expressed as follows: For each point $P_i$ and its via point $V_i$ determine if the distance from $P_i$ to the switching center SC is less than the distance $V_i$-to-SC. If it is less, compare the distance $V_{i+1}$-to-SC (where $V_{i+1}$ is the via point for $V_i$) with the distance $V_{i+2}$-to-SC (where $V_{i+2}$ is the via point for $V_{i+1}$). Continue these comparisons. When the distance $V_{i+j}$-to-SC is found to be greater than the distance $V_{i+j+1}$-to-SC then consider reversing the homing between $P_i$ and $V_{i+j}$.

In other words, the step described above is directed at examining each point to determine if it is closer to the switching center than to its respective via point. If it is closer to the switching center, the via point in turn is examined to see if it is closer to the center than is its via point, and so forth. When an examined point is found to be farther from the switching center than is its via point, then an attempt is made to rearrange the routing so that the previously-considered group of points is connected to the center through the closest point of the group.

Figure 9:
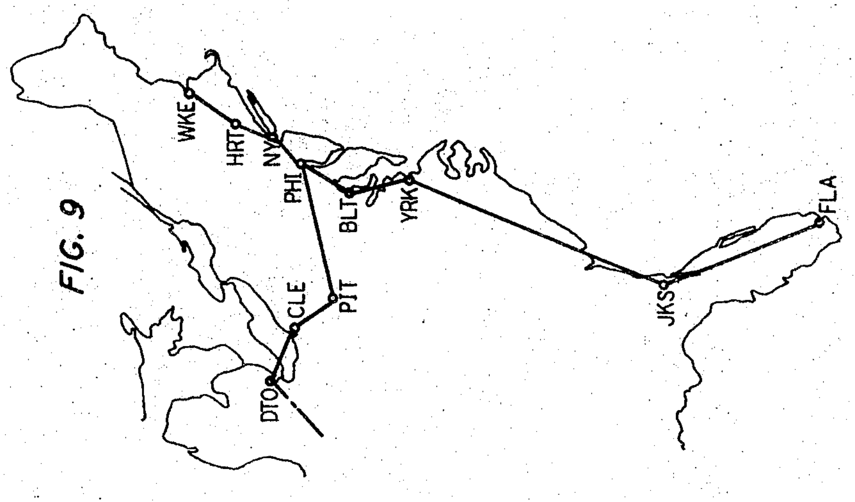
FIG. 9 represents the final version of the FIG. 1 network as reconfigured in accordance with this invention.

To relate the above-specified step to the particular network shown in FIG. 8, consider the PIT-to-CLE-to-DTO-to-PHI loop. Initially PIT and CLE are compared in terms of their respective distances to NY. Since PIT is closer to NY than is CLE, the distance from CLE to NY is compared with the distance from DTO to NY. Since CLE is closer to NY than is DTO, this particular processing step continues by comparing the distance from DTO to NY with the distance from PHI to NY. Since PHI is closer to NY than is DTO, the searching operation of the specified step is terminated. Then the PIT-to-CLE-to-DTO homing sequence is reversed one point at a time and a pricing of the DTO-to-CLE-to-PIT-to-PHI path is carried out. This cost is compared with that for the prior PIT-to-CLE-to-DTO-to-PHI routing. Since the new routing is less costly than the prior one, the new more direct path is substituted therefor. This reconfiguration leads to the final network arrangement shown in FIG. 9. The total cost of the FIG. 9 network is $44,657.62, which is $12,555.04 less than that of the initial FIG. 1 network.

According to the procedure specified above, all of the access points included in a network configuration are considered in an ordered sequence as possible via points. In many cases (such as in the particular example considered herein and depicted in FIGS. 5 through 9) this procedure alone is effective to generate a network characterized by a minimum or near-minimum cost. However, there are other cases in which an iteration of the steps heretofore described will further lower the overall cost of the generated network. Hence such an iteration is advantageously included as a standard step in the basic procedure of the invention. This iteration is based on the recognition that the development of the network may have added sufficient additional capacity to particular portions thereof to alter the alternatives available for rerouting a particular access point. More specifically, there are cases in which a particular access point is routed through a more distant via point rather than through a closer one because of the distribution of spare channels at the time the cost comparison takes place. Subsequently, however, the closer via point may develop sufficient spare channels to cover the requirements of the access point being considered for connection thereto. In this event the overall cost of the network is often reduced if the closer point is subsequently substituted as the via point for the particular access point. The specified second iteration concerns itself only with examining the possibility of rerouting access points that have such closer alternative via points available thereto.

The systematic procedure described herein is in fact an electrical signal processing operation. Signals representative of the above-mentioned table of charges constitute one set of input signals which the procedure is adapted to selectively manipulate. Another set of input signals therefor specifies the respective locations of the switching center and of the access points included in the network to be reconfigured. A third set of input signals specifies the number of lines and trunks required by each point of the network. A general-purpose computer is well suited to carry out the described data signal processing steps characteristic of the invention. Such a computer (an IBM 7094) has actually been programmed to carry out the systematic procedure specified above. An illustrative set of program instructions that is effective to direct an IBM 7094 machine to implement the unique procedure of the invention is set forth below.

```
C        TELØUT  FØRMS THE TELPAK LAYØUT ØF ACCESS LINES AND TRUNKS
         SUBRØUTINE TELØUT
         (ALL REQUIRED INPUT DATA IS ASSUMED TO HAVE BEEN ALREADY STORED IN A
          CØMMØN AREA OF THE MAIN MEMORY OF THE SYSTEM.  IN ADDITION, A
          STRAIGHTFORWARD PRICING ROUTINE THAT FINDS THE LEAST EXPENSIVE PRIVATE
          LINE AND/OR TELPAK COMBINATION FOR A GIVEN LINE REQUIREMENT IS ASSUMED
          TO BE STORED IN THE MAIN MEMORY.)
C
         CØMMØN JØME,   MARK,  KAND,  NØRTH, NEXT,  CNEW,  FNEW,  DNEW,
        1       TNEW,  TPNEW, PNEW,  TTNEW, TØLD,  TPØLD, TTØLD, PØLD,
        2       DØLD
         DIMENSIØN              JØME(600),      MARK(600),      KAND(600),
        1     NØRTH(600),       NEXT(600),      CNEW(600),      FNEW(600),
        2     DNEW(600),        TNEW(600),      TPNEW(600),     PNEW(600),
        3     TTNEW(600),       TØLD(600),      TPØLD(600),     TTØLD(600),
        4     PØLD(600),        DØLD(600)
         DIMENSIØN          JNPA(600),      JØINA(300),     JØINB(300),
        1     MC(300),          NC(300),        RLØAD(300),     RTRUNK(300),
        2     JAFØ(25),         JBØFØ(25),       JSUPER(25),      RTEMP(300),
        3     RBUFR(300)
C
         EQUIVALENCE (JNPA,JØME),(JØINA,MARK),(JØINB,KAND),(RLØAD,NØRTH),
        1     (RTRUNK,NEXT),(JAFØ,MC,CNEW),(JBØFØ,CNEW(101)),(JSUPER,
        2     CNEW(201)),(NC,FNEW),(RTEMP,DNEW),(RBUFR,TNEW)
C
         CØMMØN NØLD,  CIDA,  CIDB,  VCITY, HCITY, CLØAD, CTRUNK,DICER,
        1     CØSUM, CHUNK
         CØMMØN TITLE, TØTAL, NCEN,  VREG,  HREG,  INDEX, NPR,   KEYCI
C
         DIMENSIØN              NØLD(600),      CIDA(600),      CIDB(600),
        1     VCITY(600),       HCITY(600),     CLØAD(600),     CTRUNK(600),
        2     DICER(600),       CØSUM(600),     CHUNK(600)
         DIMENSIØN              TITLE(12),      TØTAL(15),      NCEN(25),
        1     VREG(25),         HREG(25),       INDEX(25),      NPR(25),
        2     KEYCI(25),        ITØTAL(15)
         EQUIVALENCE  (TØTAL,ITØTAL)
```

```
C
         CØMMØN NRUNT,NØCI,NØN,NØNPA,NREG,NREGP,NRLINK,NØRUN,CØNST,LØKEY,
        1     BPRØB,RPRØB,NMIN,XMAX,IARØC,NAFF,NØFF,TCØSTH
C
         CØMMØN TREQ,  TØRIG, TUNK,  PLIN,  TPLIN, DISCEN,RTDIS,
        1       NØME,  CØSTM, CØSTR, CØST,  PLØUT, TPLØUT,IP,
        2       ITP,   ID,    FACIL, DCCLIM,NBAND, NPAKS,NWIDE, ICAT
         DIMENSIØN              TELMIR(16),     TELBUN(16),     ALNUM(16),
        1     PLPER(10),        PLMILE(11),     PLRATE(10),     WDPER(10),
        2     WDMILE(11),       WDRATE(10),     ITK(16)
         DIMENSIØN IWDKEY(16)
         CØMMØN DBUN,  DRATE, CØNN,  DCC,   TRMPAA,TRMPAS,TRMPSS,
        1       TRMTAA,TRMTAS,TRMTSS,SWICHA,SWICHT,TELMIR,TELBUN,
        2       ALNUM, PLPER, PLMILE,PLRATE,ITK,   WDPER, WDMILE,WDRATE,
        3       TRMWSA,TRMWSB,SWITWD,CØNNWA,CØNNWB,TRMWDA,TRMWDB,IWDKEY
C
         DIMENSIØN  LAST(10),    INIT(10)

         DISTF(A,B,C,D)= SQRT(((A-B)**2+(C-D)**2)/10.)

C
C        JØME IS HØME IF ACCESS PØINT, 0 IF SWITCHER
C        CØSUM IS CØST (CNEW)
C        CHUNK IS FACILITY (FNEW)
C        DØLD IS DISTANCE (DNEW)

C        TØLD IS TØTAL REQUIRED LINES (TNEW)
C        TPØLD IS NØ. INCØMING PRIVATE LINES FRØM TRUNKS (TPNEW)
C        PØLD IS TØTAL NØ. INCØMING PRIVATE LINES (PNEW)
C        TTØLD IS NØ. REQUIRED LINES FRØM TRUNKS (TTNEW)
C
C
C        HØME LIST HAS BEEN SET TØ SWITCHER BY
C        M.P.  HØME(SWITCHER)=0
C
C
```

```
      CØSTA=0
      DØ 37 I=1,NØCI
      MARK(I)=0
      IF(DICER(I)-DCCLIM)31,31,34
   31 IF(DICER(I))33,33,36
   33 MARK(I)=-1
      GØ TØ 36
   34 IF(NØLD(I))36,35,35
   35 CØSUM(I)=CØSUM(I)-DCC*CTRUNK(I)
   36 CØSTA=CØSTA+CØSUM(I)
   37 CØNTINUE
C
C     HØME BY REGIØNS
C
      LL=0
      DØ 3000 KK=1,NREG
      L=LL+1
      LL=KEYCI(KK)

C     GRØUPING TRUNKS TØGETHER AT PØINTS LØCATED AT THE SAME PLACE.
C     SØRT CITIES BY DISTANCE ØVER SIZE

      DØ 333 IMP=1,2
      NH=0

      IBØT=L
    5 T=0
      DØ 12 J=IBØT,LL
      IF(J-IBØT)4,8,4
    4 IF(VCITY(J)-VCITY(IBØT))14,6,14
    6 IF(HCITY(J)-HCITY(IBØT))14,8,14
    8 T=T+CTRUNK(J)
      ITØP=J
      GØ TØ (12,14),IMP
   12 CØNTINUE
```

```
C
   14 IF(MARK(IBØT))25,16,16
   16 IF(NØLD(IBØT))25,18,18
   18 IF(T)25,25,20
   20 NH=NH+1
      DNEW(NH)=DICER(IBØT)/T
      NØRTH(NH)=IBØT
   25 IBØT=ITØP+1
      IF(IBØT-LL)5,5,26
C
   26 IF(NH-1)305,40,21

   21 CALL SØRT1(DNEW,NH,+1,NØRTH)

C     ATTEMPT TØ HØME ØTHER CITIES ØN CITIES IN NØRTH.

C     ØUTSIDE CITIES HAVE NEGATIVE ØLD NUMBERS AND ARE
C          NØT ALLØWED TØ EITHØR HØME ØR BE HØMES.
C     MAKE 2 PASSES.  ØN PASS 1 CØNSIDER CITIES WHERE DISTANCE TØ NHØM
C     IS LESS THAN THE DISTANCE TØ THE SWITCHER.  ØN PASS 2 CØNSIDER
C     CITIES WHØSE DISTANCE TØ NHØM IS LESS THAN THE DISTANCE TØ THEIR
C     PREVIØUS VIA PØINTS.

   40 RTDIS=0
      DØ 300 IH=1,NH
      NHØM=NØRTH(IH)

C     MARK THE NEW HØMES PATH WITH -1 AND CØMPUTE THE RØUTING DISTANCE
      M=NHØM
   52 MARK(M)=-1
      M=JØME(M)
      IF(M)54,54,52
```

```
C       SELECT ANY CITY CLØSER TØ NHØME THAN THE SWITCHER
C            EXCEPT THØSE ØN NHØM-S TREE
C            AND ØFF-NET PØINTS

  54    NK=0
        DØ 65 J=L,LL
        IF(NØFF-1)55,55,56
  55    IF(NØLD(J))65,65,56
  56    IF(MARK(J))65,58,900
  58    DA=DISTF(VCITY(J),VCITY(NHØM),HCITY(J),HCITY(NHØM))
        GØ TØ (62,64),IMP
  62    IF(DA-DICER(J))60,65,65
  64    IF(DA-DØLD(J))60,65,65
  60    NK=NK+1
        CNEW(NK)=DA
        KAND(NK)=J
  65    CØNTINUE
        IF(NK-1)650,69,68

C       RESET HØME MARKS TØ 0 IF NØ CITIES ARE CLØSER TØ NHØM THAN SWITCH.

 650    M=NHØM
 651    MARK(M)=0
        M=JØME(M)
        IF(M)300,300,651

  68    CALL SØRT1(CNEW,NK,+1,KAND)


C       TRY TØ HØME CITIES IN LIST BY 1S,2S,3S,4S.
  69    DØ 700 J=1,NK
        M=KAND(J)
        DNEW(M)=CNEW(J)
 700    CØNTINUE
```

```
        JTØP=1
  73    LIM=  MINO(JTØP+3,NK)
        DØ 275 KH=JTØP,LIM
        JBØT=KH

        CØPY HØMES INFØRMATIØN INTØ NEW LISTS

        M=NHØM
  81    MARK(M)=-1
        TNEW(M)=TØLD(M)
        TTNEW(M)=TTØLD(M)
        PNEW(M)=PØLD(M)
        TPNEW(M)=TPØLD(M)
        M=JØME(M)
        IF(M)82,82,81
C       RANK HØMES TØ SHØW NUMBER ØF TRUNK GRØUPS
C       BEING REMØVED FRØM ØLD TREE BRANCHES.
C       IF MARKS ARE NØT PØSITIVE, (INITIAL STATE), CØPY
C       TRUNK FACILITY INFØRMATIØN INTØ NEW LISTS.

  82    DØ 80 J=JTØP,JBØT
        M=KAND(J)
  71    IF(MARK(M))78,72,74
  72    PNEW(M)=PØLD(M)
        TPNEW(M)=TPØLD(M)
        TNEW(M)=TØLD(M)
        TTNEW(M)=TTØLD(M)
  78    MARK(M)=1
        GØ TØ 75
  74    MARK(M)=MARK(M)+1
  75    M=JØME(M)
        IF(M)80,80,71
  80    CØNTINUE
```

```
      C     LINK NØDES ACCØRDING TØ RANK.MARK PRØCESSED
      C     NØDES NEGATIVE.  LINKED LIST IS CALLED "NEXT".

            DØ   20005   I999  = 1,10
      20005  LAST(I999) = 0

            DØ 100 J=JTØP,JBØT
            M=KAND(J)
       97   IF(MARK(M))100,901,92
       92   JRANK=MARK(M)
            MARK(M)=-MARK(M)
            IF(LAST(JRANK))94,94,95
       94   INIT(JRANK)=M
            GØ TØ 96
       95   LLL=LAST(JRANK)
            NEXT(LLL)=M
       96   LAST(JRANK)=M
            NEXT(M)=0
            M=JØME(M)
            IF(M)100,100,97
      100   CØNTINUE

      C     LINK RANKS TØGETHER
      C     FIRST ØF HIGHER RANK JØINS LAST ØF LØWER RANK.

            M=LAST(1)
            DØ 104 J=2,4
            IF(LAST(J))104,104,102
      102   NEXT(M)=INIT(J)
            M=LAST(J)
      104   CØNTINUE
```

```
      C     REMØVE TRUNKS FRØM CITIES ØLD PATHS
      C     REMØVE PRIVATE LINE CØUNTS.  MARKS BECØME ZERØ.

            DØ 150 J=JTØP,JBØT
            M=KAND(J)
            TK=TNEW(M)
            TTK=TTNEW(M)
            JRANK=MARK(M)
            MARK(M)=0
            N=JØME(M)
            IF(N)150,150,105
      105   F=CHUNK(M)
            PNEW(N)=ABS(PNEW(N)-PRIVA(F))
            TPNEW(N)=ABS(TPNEW(N)-PRIVB(F))
      110   TNEW(N)=TNEW(N)-TK
            TTNEW(N)=TTNEW(N)-TTK
            IF(MARK(N))115,150,905
      115   MARK(N)=MARK(N)-JRANK
            N=JØME(N)
            IF(N)150,150,110
      150   CØNTINUE

      C     RECALCULATE CØSTS (IGNØRING) RØUTING DISTANCES

            CØSTB=CØSTA

      C     MARK NØDES REHØMED +1

            DØ 195 J=JTØP,JBØT
            M=KAND(J)
      195   MARK(M)=1

      C     MARK NØDES ALØNG MAIN PATH + 1
```

```
      M=NHØM
190   MARK(M)=1
      M=JØME(M)
      IF(M)201,201,190

C     CALCULATE CØST ØF ALL CITIES WITH 0 MARKS
C     RESET ALL MARKS TØ 0

201   M=INIT(1)
202   IF(MARK(M))205,205,240
205   TØRIG=CTRUNK(M)
      TREQ=TNEW(M)
      TUNK=TTNEW(M)
      DISCEN=DØLD(M)
      PLIN=PNEW(M)
      TPLIN=TPNEW(M)
      NØME=JØME(M)
      CALL TCØST
      FNEW(M)=FACIL
      CNEW(M)=CØST
      CØSTB = CØSTB-CØSUM(M)+CØST
      IF(JØME(M))240,240,230
230   N=JØME(M)
      F=CHUNK(M)
      PNEW(N)=ABS(PNEW(N)-PRIVA(F)+PLØUT)



      TPNEW(N)=ABS(TPNEW(N)-PRIVB(F)+TPLØUT)
240   MARK(M)=0
      M=NEXT(M)
      IF(M)250,250,202
```

```
C     CALCULATE CØSTS ØF REHØMED CITIES

250      TK = 0
        TTK = 0
      DØ 170 J=JTØP,JBØT
      M=KAND(J)
165   TK=TK+TNEW(M)
      TTK=TTK+TTNEW(M)
      TØRIG=CTRUNK(M)
      TREQ=TNEW(M)
      TUNK=TTNEW(M)
      DISCEN=DNEW(M)
      PLIN=PNEW(M)
      TPLIN=TPNEW(M)
      NØME=NHØM
      CALL TCØST
      FNEW(M)=FACIL
      CNEW(M)=CØST
      PNEW(NHØM)=PNEW(NHØM)+PLØUT
      TPNEW(NHØM)=TPNEW(NHØM)+TPLØUT
      CØSTB = CØSTB-CØSUM(M)+CØST
      MARK(M)=0
170   CØNTINUE

C     CALCULATE CØST ØF NHØMES TREE

      M=NHØM
      GØ TØ 172
185   F=CHUNK(M)
      PNEW(N)=ABS(PNEW(N)-PRIVA(F)+PLØUT)
      TPNEW(N)=ABS(TPNEW(N)-PRIVB(F)+TPLØUT)
      M=N
172   TØRIG=CTRUNK(M)
      TNEW(M)=TNEW(M)+TK
      TTNEW(M)=TTNEW(M)+TTK
      TREQ=TNEW(M)
```

```
      TUNK=TTNEW(M)
      DISCEN=DØLD(M)
      PLIN=PNEW(M)
      TPLIN=TPNEW(M)
      NØME=JØME(M)
      CALL TCØST
      FNEW(M)=FACIL
      CNEW(M)=CØST
      CØSTB = CØSTB-CØSUM(M)+CØST
      IF(MARK(M))189,189,188
  188 NEXT(M)=INIT(1)
      INIT(1)=M
      MARK(M)=0
  189 N=JØME(M)
      IF(N)200,200,185

C     TEST CØST AND REPLACE ØLD INFØRMATIØN

  200 IF(CØSTB-CØSTA)255,275,275
  275 CØNTINUE
      JTØP=JTØP+1
      IF(JTØP-NK)73,73,300

  255 M=INIT(1)
  260 CØSUM(M)=CNEW(M)
      CHUNK(M)=FNEW(M)
      TØLD(M)=TNEW(M)
      TTØLD(M)=TTNEW(M)
      PØLD(M)=PNEW(M)
      TPØLD(M)=TPNEW(M)
      M=NEXT(M)
      IF(M)263,263,260
```

```
  263 CØSTA=CØSTB

      DØ 265 J=JTØP,JBØT
      M=KAND(J)
      DØLD(M)=DNEW(M)
  265 JØME(M)=NHØM

C     RESET JTØP

      JTØP=JBØT+1

      IF(JTØP-NK)73,73,300

  300 CØNTINUE
C
C     ITERATIØN 3.  CØNSIDER PØINTS CLØSER TØ THE SWITCHER THAN THEIR
C     VIA PØINTS.  TRACE SUCH PØINTS UNTIL PØINTS ARE FARTHER FRØM THE
C     SWITCHER THAN THEIR VIA PØINTS.  TRY TØ REVERSE THE DIRECTIØN ØF
C     FLØW ALØNG THE PATH SEGMENT .
C
      DØ 1090 NHØM=L,LL
      IF(NØLD(NHØM))1090,1090,1002
 1002 N=JØME(NHØM)
      IF(N)1090,1090,1005
 1005 IF(DICER(NHØM)-DICER(N))1008,1090,1090
C
 1008 M=NHØM
      N=JØME(M)
      NEXT(M)=0
      PNEW(M)=PØLD(M)
      TPNEW(M)=TPØLD(M)
      TNEW(M)=TØLD(M)
      TTNEW(M)=TTØLD(M)
```

```
C
C     .REMØVE TRUNK CØUNTS AND LINE CØUNTS ALØNG THE SEGMENT
C
 1010 F=CHUNK(M)
      PNEW(N)=ABS(PØLD(N)-PRIVA(F))
      TPNEW(N)=ABS(TPØLD(N)-PRIVB(F))
      TNEW(N)=TØLD(N)-TØLD(M)
      TTNEW(N)=TTØLD(N)-TTØLD(M)
      DNEW(N)=DØLD(M)
      NEXT(N)=M
      M=N
      N=JØME(N)
      IF(DICER(M)-DICER(N))1010,1020,1020
C
C     THE PATH IS NØW BRØKEN INTØ 2 SEGMENTS,  A CHAIN FRØM NHØM TØ M,
C     AND A CHAIN FRØM N TØ THE SWITCHER.  REMØVE INCØMING PRIVATE
C     LINE CØUNTS ØN THE SEGMENT JØINTING N TØ THE SWITCHER
C
 1020 NP=N
      LAST(1)=M
 1025 F=CHUNK(M)
      PNEW(N)=ABS(PØLD(N)-PRIVA(F))
      TPNEW(N)=ABS(TPØLD(N)-PRIVB(F))
      TNEW(N)=TØLD(N)
      TTNEW(N)=TTØLD(N)
      DNEW(N)=DØLD(N)
      NEXT(N)=JØME(N)
      M=N
      N=JØME(N)
      IF(N)1030,1030,1025
C
C     REBUILD THE SEGMENT FRØM M TØ NHØM.
C
 1030 CØSTB=CØSTA
      M=LAST(1)
      N=NEXT(M)
```

```
 1035 TNEW(N)=TNEW(N)+TNEW(M)
      TTNEW(N)=TTNEW(N)+TTNEW(M)
      M=N
      N=NEXT(N)
      IF(N)1040,1040,1035
C
 1040 NEXT(NHØM)=NP
      DNEW(NHØM)=DISTF(VCITY(NHØM),VCITY(NP),HCITY(NHØM),HCITY(NP))
C
C     REPRICE THE NEW PATH FRØM NHØM ALL THE WAY TØ THE SWITCHER.
C
      M=LAST(1)
 1045 TØRIG=CTRUNK(M)
      TREQ=TNEW(M)
      TUNK=TTNEW(M)
      DISCEN=DNEW(M)
      PLIN=PNEW(M)
      TPLIN=TPNEW(M)
      NØME=NEXT(M)
      CALL TCØST
      FNEW(M)=FACIL
      CNEW(M)=CØST
      PNEW(NØME)=PNEW(NØME)+PLØUT
      TPNEW(NØME)=TPNEW(NØME)+TPLØUT
      CØSTB=CØSTB-CØSUM(M)+CØST
      M=NØME
      IF(M)1050,1050,1045
C
C     TEST THE CØST
C
 1050 IF(CØSTB-CØSTA) 1055,1090,1090
C
 1055 M=LAST(1)
 1060 CØSUM(M)=CNEW(M)
      CHUNK(M)=FNEW(M)
      TØLD(M)=TNEW(M)
      TTØLD(M)=TTNEW(M)
```

```
      PØLD(M)=PNEW(M)
      TPØLD(M)=TPNEW(M)
      JØME(M)=NEXT(M)
      DØLD(M)=DNEW(M)
      M=NEXT(M)
      IF(M)1070,1070,1060
 1070 CØSTA=CØSTB
 1090 CØNTINUE
 333  CØNTINUE

C     CALCULATE RØUTING DISTANCES.  ADD DIAL CØNDITIØNING
C     CHARGES

 305  DØ 725 J=L,LL
      IF(NØLD(J))725,707,707
 707  M=J
      RTDIS=0
 705  RTDIS=RTDIS+DØLD(M)
      M=JØME(M)
      IF(M)710,710,705
 710  IF(RTDIS-DCCLIM)725,725,720
 720  CØST=DCC*CTRUNK(J)
      CØSUM(J)=CØSUM(J)+CØST
      CØSTA=CØSTA+CØST
 725  CØNTINUE

C     ØUTPUT SECTIØN

      K=NCEN(KK)
      WRITE (6, 3201) KK,K,CIDA(K),CIDB(K)
      WRITE (6, 3210  )
       DØ   20006   I999   = 1,15
C
20006  TØTAL(I999) = 0
      DØ 2000 M = L,LL
      IF(K-M)2330,2325,2330

 2325 CØSTM=0.
      CØSTR=CØSUM(K)
      WRITE (6,3250) K,CIDA(K),CIDB(K),DICER(K),CTRUNK(K),TTØLD(K),
     1     TØLD(K),PØLD(K),CØSTM,CØSTR
      GØ TØ 2350

 2330 IF(JØME(M))2335,2335,2340
 2335 JØME(M)=K
 2340 LLL=JØME(M)

      FACIL=CHUNK(M)
      DISCEN=DØLD(M)
      TREQ=TØLD(M)
      CØST=CØSUM(M)
      CALL DECIPH
      ICAT=ICAT
C
C
      WRITE (6,3500) M,CIDA(M),CIDB(M),LLL,CIDA(LLL),CIDB(LLL),DISCEN,
     1     CTRUNK(M),TTØLD(M),TØLD(M),PØLD(M),CØSTM,CØSTR,IP,ALNUM(ICAT)
      IF(ICAT-1)2344,2344,2342
 2342 ITK(ICAT)=ITK(ICAT)+1
 2344 ITK(1)=ITK(1)+IP
      IF(ID)2350,2350,2346
 2346  WRITE (6,3510) ID,ALNUM(NPAKS)

 2350 TØTAL(1)=TØTAL(1)+ DISCEN
      TØTAL(2)=TØTAL(2)+CTRUNK(M)
      TØTAL(3)=TØTAL(3)+TTØLD(M)
      TØTAL(4)=TØTAL(4)+TØLD(M)
      TØTAL(5)=TØTAL(5)+CØSTM
      TØTAL(6)=TØTAL(6)+CØSTR
 2000 CØNTINUE
```

```
C
      WRITE (6,3750) (TØTAL(I),I=1,6)

 3000 CØNTINUE
      TCØSTH=CØSTA
      RETURN
C     FØRMATS
 3201 FØRMAT (1H1,45X,30HTELPAK ARRANGEMENTS FØR REGIØN,I3/1H ,47X,12HSW
     1ITCHER AT,I4,2X,2A6)
 3210 FØRMAT (1H07X,4HCITY15X,6HENDPT.8X,42HDISTANCE    ØLD    INTER   T
     1TAL  INCØMING,2X,7HMILEAGE,5X,8HTERMINAL / 5H  NØ.,6X,4HNAME,7X,
     23HNØ.,6X,4HNAME,6X,7HØF LINK,4X,21HLINES  REG.TKS  LINES,4X,2HPL,Y
     3X,4HCØST,8X,4HCØST,5X,11HPL    TELPAK//)
 3250 FØRMAT(1H I4,2X,2A6,20X,F10.0,3F8.0,F6.0,2F12.2)
 3500 FØRMAT(1H I4,2X,2A6,I6,2X,2A6,F10.0,3F8.0,F6.0,2F12.2,I6,3X,A4)
 3510 FØRMAT(1H+,116X,1H+,I4,A4)
 3750 FØRMAT(1H033X,5HTØTAL,F10.0,3F8.0,6X,2F12.2)
C
C     DIAGNØSTICS
  900 WRITE (6, 9000  )
      STØP
 9000 FØRMAT (12H0****54 STØP)
  901 WRITE (6, 9001  )
      STØP
 9001 FØRMAT (12H0****97 STØP)
  905 WRITE (6, 9005  )
      STØP
 9005 FØRMAT (13H0****110 STØP)
      END
```

Figure 10:
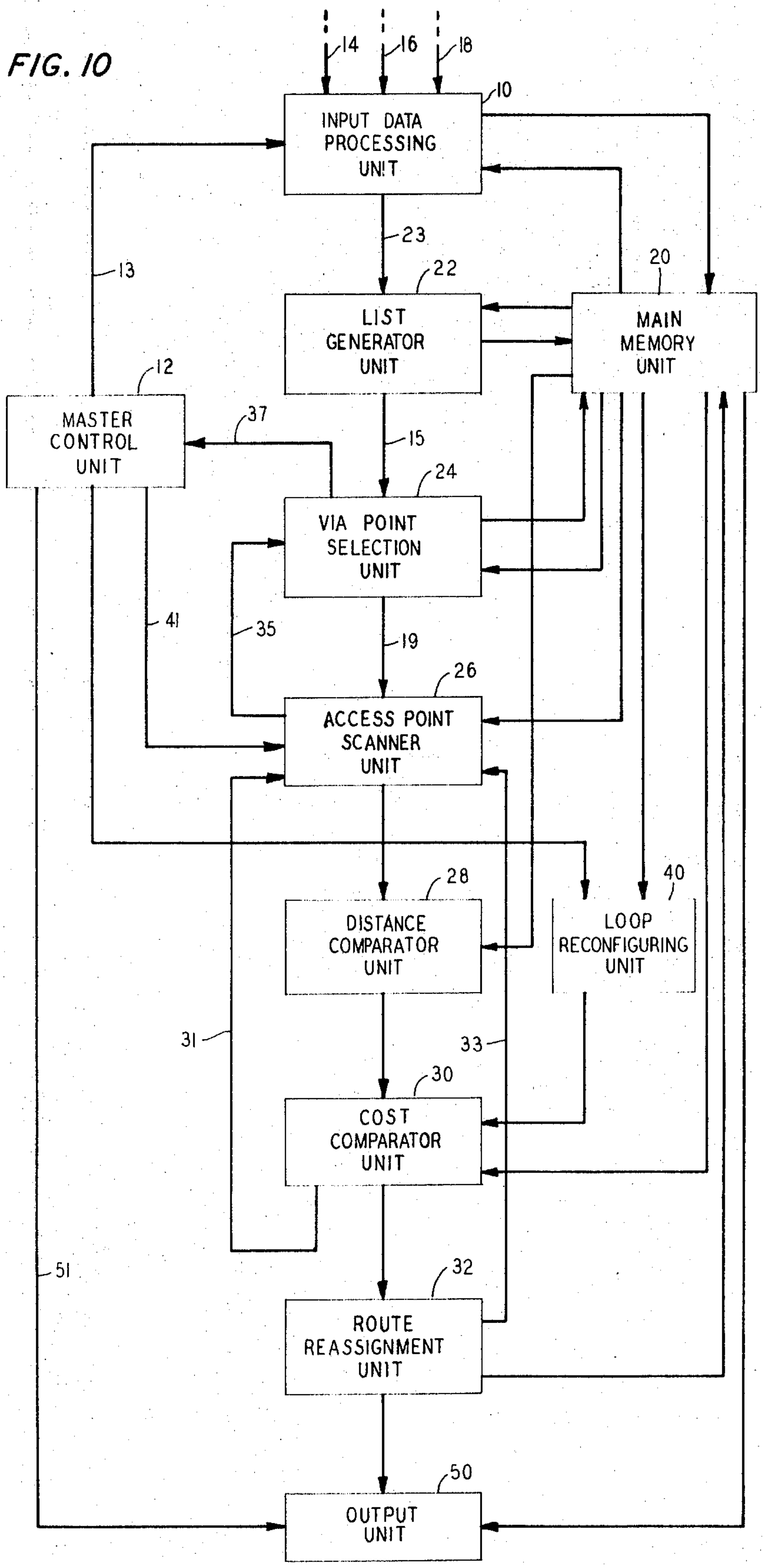
FIG. 10 is an illustrative data processing apparatus adapted to carry out the unique procedure which embodies the principles of the present invention.

An alternative way to carry out the systematic procedure of the present invention is by means of a special-purpose apparatus constructed to process electrical signals in the particular manner specified above. An illustrative such apparatus is depicted in FIG. 10. The apparatus shown there includes an input data processing unit 10 which, when signaled by a master control unit 12 via a lead 13, is adapted to read input data signals applied to the unit 10 via leads 14, 16 and 18. The input signals appearing on the leads 14, 16 and 18 are respectively representative of (1) the table of charges for the network model to be processed, (2) the locations of the switching center and of the access points included in the network, and (3) the number of lines and trunks required by each point of the network.

The locations of the switching center and of the access points may, for example, be specified in a conventional way in accordance with a standard coordinate grid representation. In such a case the input unit 10 is adapted to be controlled by an instruction routine stored in a main memory unit 20 to process the coordinate specifications and to derive therefrom a table of access points-to-switching center distances. This table and the respective capacities of the points of the network are then stored in the memory unit 20. In other words the unit 20 is arranged to store the aforementioned D and S parameters for each of the network points.

Subsequently the unit 10 of FIG. 10 signals a list generator unit 22 (via a lead 23) to commence processing the noted D and S parameters stored in the memory unit 20. In response thereto the unit 22 generates an ordered ranking of the type shown in FIG. 4. This ranking is then stored in specified locations in the unit 20.

Upon completion of its list generating function, the unit 22 applies a signal to a lead 15 to trigger a via point selection unit 24 to commence selecting potential via points in order from the ranked list stored in the unit 20. For each via point so selected the unit 24 applies a signal to a lead 19 to initiate a scanning operation by an access point scanner unit 26. In particular, the unit 26 operates to scan the access point representations (except the selected via point one) stored in the memory unit 20 in order of increasing distance from the selected via point. In carrying out this operation the unit 26 implements the above-stated rule that via points may be connected to each other but no access point which homes on a particular via point can in turn become a via point for the particular point.

For each scanned point a unit 28 is activated by the unit 26 to compare the access point-to-via point distance to the corresponding access-point-to-switching center distance. If the former distance is less, a cost comparator unit 30 is signaled to compare the cost of the present route excluding the via point with the cost of the prospective route through the via point. If the cost of the latter is more, the unit 26 is signaled via a lead 31 to scan more than one access point at a time. Thereafter additional distance and cost comparisons are carried out by the units 28 and 30. If no lower cost configuration is detected during this operation, the unit 26 then continues its normal scanning operation. If, however, a lower cost configuration is detected thereby, a route reassignment unit 32 is activated to generate the new lower-cost route and to apply signals representative of that new route to the memory unit 20. Following the reassignment operation, the unit 26 is signaled via a lead 33 to resume its scanning operation.

When all the access points being considered with respect to a particular via point have been scanned and processed from a distance and cost standpoint, the unit 26 signals the unit 24 (via a lead 35) to select the next potential via point. The basic process implemented by the novel apparatus of FIG. 10 then continues.

When all access points have been considered as possible via points by the unit 24, the master control unit 12 is notified of this fact by a signal applied thereto via a lead 37. As a consequence thereof the unit 12 triggers a loop unit 40 to determine whether or not a reconfiguring operation of the type described above in connection with the PIT-to-CLE-to-DTO loop of FIG. 8 should be carried out. Following that operation, the scanner unit 26 is signaled by the master control unit 12 to perform the iteration specified above for any indicated access point that has available to it a closer via point than the via point to which the indicated point is connected. At the conclusion of that iteration an output unit 50 is signaled by the master control unit 12 via a lead 51 to read out of the memory unit 20 the resulting network configuration stored therein. Advantageously the unit 50 comprises a printer and a microfilm plotter for providing a detailed print-out specifying the required trunks and access lines of the final network, a detailed pricing thereof and a microfilm map of the actual reconfigured network.

The particular structure or circuitry of each of the illustrative units included in the FIG. 10 apparatus is considered to be clearly within the skill of the art in view of the specific functional requirements therefor set forth herein. Alternatively each of the units shown in FIG. 10 can be implemented in a straightforward way (in view of the teachings herein) by suitably programming a general-purpose computer.

Thus there have been described herein in detail a systematic method and apparatus adapted to carry out the method. In accordance with this description a given communication arrangement can be reconfigured in a precise high-speed manner to form a network characterized by a minimum or near-minimum cost. The principles of the present invention are however more widely applicable. In particular these principles may be employed in the design of a variety of geographically-dispersed systems having the basic attributes specified above. Illustratively such systems include pipeline distribution arrangements in which commodities are shipped to a number of points from a single source (for example, from a well or refinery). Also illustrative of such other systems is an electrical transmission network which supplies a number of communities from a central generating or distributing station.

Finally, it is to be understood that the above-described procedure and apparatus are only illustrative of the application of the principles of the present invention. In accordance with these principles numerous other arrangements may be devised by those skilled in the art without departing from the spirit and scope of the invention. For example, although in the specific illustrative procedure described above the ratio $D/S$ was employed as the particular basis for generating the ordered ranking of FIG. 4, it is apparent that other characteristics of distance and size are also suitable therefor.

What is claimed is:

1. The method, carried out by a computing machine, of processing electrical input signals that are representative of the configuration of an initial distribution network to obtain therefrom electrical output signals that are representative of a reconfigured minimum cost or near-minimum cost version of the initial network, said initial network comprising a main point and a plurality of associated points each connected to the main point by a direct straightline route of a specified distance and capacity, the cost per unit of capacity in said network decreasing with increasing capacity, said method comprising the steps of, generating by means of said computing machine electrical signals representative of an ordered ranking of the associated points in accordance with a specified characteristic of distance and capacity, processing by means of said computing machine said generated signals in order to consider each point represented thereby as a potential via point through which the paths from other points which are closer to the via point than to the main point may be routed to the main point, and generating by means of said computing machine electrical signals representative of the path of a particular associated point being routed through a via point to the main point if the cost of the route through the via point is less than the cost of the route from the particular point to the main point excluding the via point.

2. A method as in claim 1 further including the step of processing said generated electrical signals by means of said computing machine in accordance with the rule that via points may be connected to each other during the reconfiguring process but no point which homes on a particular via point can itself become a via point for the particular point.

3. A method as in claim 2 further comprising the step of processing said generated signals by means of said computing machine such that each associated point of the network is examined to determine if it is closer to the main point than to its via point and, if it is closer, of examining the via point to determine if it is closer to the main point than is its via point, and so forth, thereby to identify routing loops defined by particular groups of points, such loops being candidates for more economical configurations.

4. A method as in claim 3 further comprising the step of rearranging by means of said computing machine the routing of an examined group of points defining a routing loop whenever a point of the group is detected to be closer to the main point than to its via point.

5. A method as in claim 4 further comprising the step of reiterating the aforedefined steps by means of said computing machine to consider rerouting associated points that are closer to newly formed via points (than to their respective via points) through the newly formed via points.

6. A machine-implemented method of processing electrical input signals that are applied to an input data processing unit that is a component of a computing machine, said signals being representative of (a) the locations of a plurality of customer service points $P_i$ with respect to a central point C, (b) the transmission capacity required between each service point and the central point, and (c) a tariff schedule in accordance with which the cost per unit of transmission capacity decreases with increasing capacity, said method being adapted to generate data signals representative of a tree configuration according to which said service points are to be interconnected with said central point to minimize the cost of interconnection, said machine-implemented method comprising the steps of:

generating by means of said computing machine, in response to the input signals applied to said data processing unit, electrical signals representative of the relative ranking of said service points in accordance with a specified ratio of distance (from the service point to the central point) to transmission capacity (between the service point and the central point), and processing by means of said computing machine said ranking signals in order of increasing magnitude to select each of said service points as a possible via point V, said processing comprising generating by means of said computing machine for each selected via point V electrical signals representative of a list, ordered in accordance with increasing distance from V, of those associated service points which are closer to V than to the central point C, said processing further comprising, for each selected via point, generating by means of said computing machine electrical signals representative of $P_i$ being re- the route $P_i$-to-V-to-C is less than that of the current routed through a particular via point V if the cost of route from $P_i$-to-C excluding V, said last-mentioned generating step being adapted to exclude any point $P_i$ that is connected to a via point V from in turn itself becoming a via point for V.

References Cited

UNITED STATES PATENTS 3,058,659 10/1962 Demmer ----------- 235—176

PAUL J. HENON, Primary Examiner

R. F. CHAPURAN, Assistant Examiner